United States Patent [19]
Meier et al.

[11] 3,843,081
[45] Oct. 22, 1974

[54] ADAPTORS FOR ANCHORING STRAPS

[75] Inventors: William A. Meier, Hoffman Estates; Edward P. Johnson, Arlington Heights, both of Ill.

[73] Assignee: Signode Corporation, Glenview, Ill.

[22] Filed: May 12, 1972

[21] Appl. No.: 252,872

[52] U.S. Cl.......... 248/223, 105/368 T, 248/361 A
[51] Int. Cl........ B60p 7/08, B61d 45/00, B65j 1/22
[58] Field of Search ............ 248/223, 224, 73, 303, 248/361 A, 119 R; 105/368 T; 24/73 C, 265 BH, 230.5 CS, 230.5 SS, 230.5 TP, 115 C, 115 J, 123 E, 123 G, 129 C, 129 B, 129 R

[56] References Cited
UNITED STATES PATENTS

| | | | |
|---|---|---|---|
| 1,396,270 | 11/1921 | Grierson................. | 24/265 BH UX |
| 2,322,576 | 6/1943 | Huebshman et al.......... | 248/DIG. 3 |
| 2,692,054 | 10/1954 | Berglund........................ | 248/224 X |
| 2,846,958 | 8/1958 | Cale ........................ | 24/230.5 TD X |
| 2,891,490 | 6/1959 | Elsner..................... | 24/230.5 TD X |
| 3,070,042 | 12/1962 | Dunlap............................ | 105/368 T |
| 3,685,778 | 8/1972 | Berns............................ | 248/361 A |
| D30,610 | 4/1899 | Doolittle ..................... | 24/73 C UX |

FOREIGN PATENTS OR APPLICATIONS

| | | | |
|---|---|---|---|
| 804,263 | 11/1958 | Great Britain...................... | 248/249 |

*Primary Examiner*—J. Franklin Foss
*Attorney, Agent, or Firm*—Dressler, Goldsmith, Clement & Gordon, Ltd.

[57] ABSTRACT

The adaptors illustrated and described herein are for anchoring straps in place relative to a support plate that is welded, or otherwise secured to the sidewall of a metal freight car. The adaptors of the present invention are designed so that they can be positioned and retained in place without requiring separate fasteners. When the adaptors and the straps secured relative to the load are located to hold the load in place, the interlocking relationship between the adaptors and their supports is such as to prevent them from being accidentally removed.

Loads carried in freight cars must be secured in place relative thereto to prevent or minimize movement thereof relative to the car. This is obviously necessary to eliminate damage to the loads that could be caused by repeated shifting and resulting collisons of the loads with adjacent loads, or by banging against walls. With the advent of substantially all metal freight cars, it is necessary to provide adaptors that can be positively and securely located in position without necessitating the use of nails, or other fasteners, which cannot be used with metal cars. Such conventional fasteners performed effectively to anchor straps that were used to retain loads in position in the cars, since they could be driven into the wooden studs spaced along the sidewalls of conventional freight cars provided with same. In the case of metal cars, where wooden supports are not present, anchors employing nails, or the like, cannot be used, thus requiring adaptors that can be inserted and secured in position relative to support plates welded to the car walls without requiring separate fasteners to retain them in place.

4 Claims, 9 Drawing Figures

PATENTED OCT 22 1974

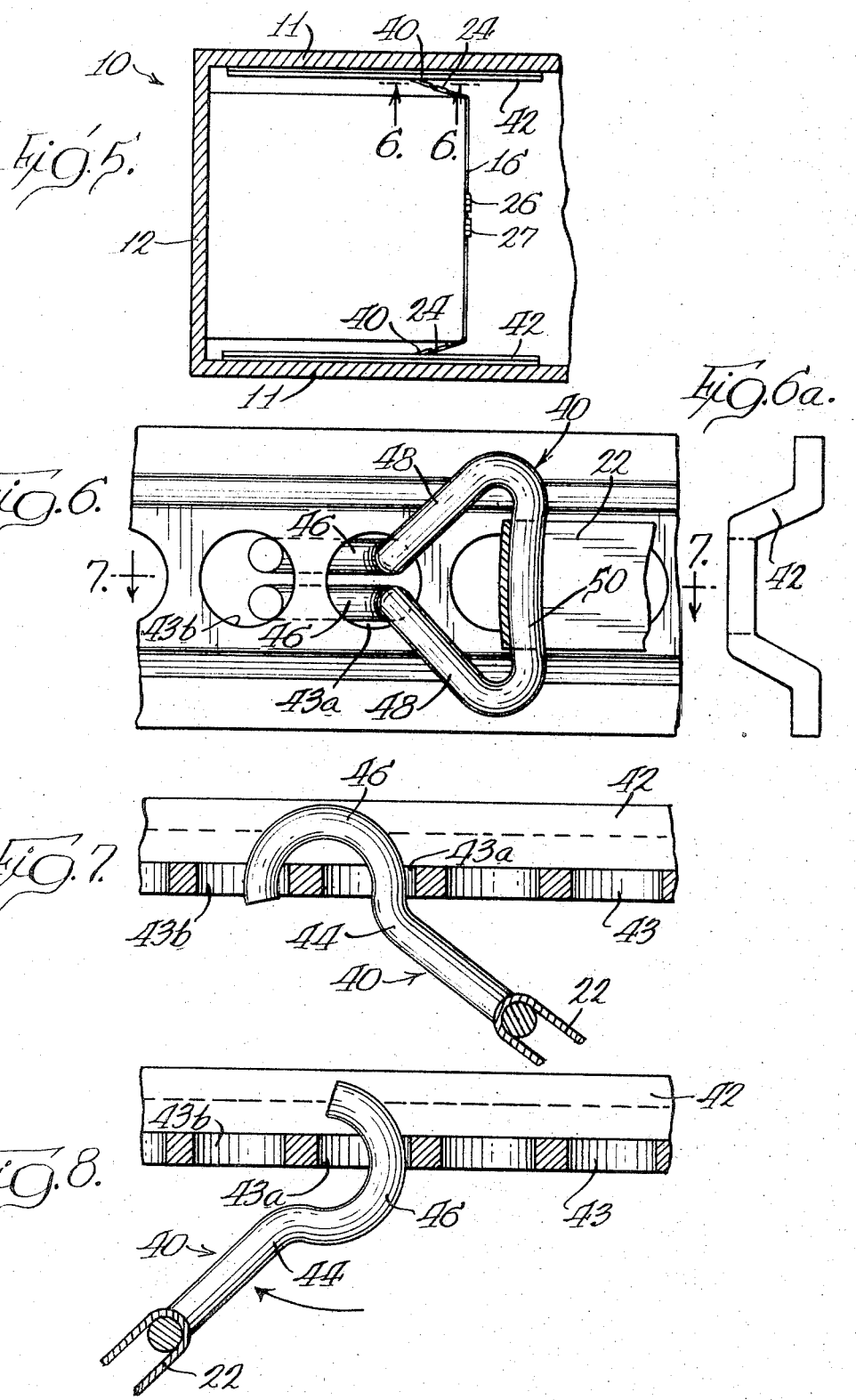

ADAPTORS FOR ANCHORING STRAPS

In conventional freight cars having wooden supports, anchor and snubber plates have been used to secure the straps employed for holding the loads in position in the car. The plates are secured to the floor, or sidewalls of the car by nails, or other suitable fastening means. Several types of these are disclosed in the U.S. Pat.: to Scales, No. 1,920,195, and to Moon, No. 2,458,287. Another type of strap connector that has been used is a cushion-type seal, such as disclosed in Meier, U.S. Pat. No. 3,653,334. All of these patents are assigned to the assignee of the present invention. These patents discuss in some detail the problems encountered in carrying loads that tend to shift in freight cars and if more specific information with respect thereto is desired, reference should be made to these three patents.

It can be appreciated that the aforementioned types of connectors cannot be used in metal cars lacking wooden supports, since there is no structure in the car to which the connector can be connected. Currently, in order to retain the loads against shifting in metal freight cars, very long bars have been used which stretch across the width of the cars. These bars have spring-loaded ends that are adapted to fit into openings in structural members secured to the sidewalls of the cars. The bars span the interior of the car and act to form a bulkhead, or barrier to prevent shifting of the loads in the car relative to each other and from moving into the car door area, which would preclude efficient unloading of the car at its destination. The utilization of long relatively expensive bars is clearly not the simple inexpensive system made possible by utilizing the present invention.

In accordance with the present invention, there are provided adaptors that permit the utilization of tensioned metal straps for securing loads in position in a metal freight car. The adaptors are designed to anchor straps to the structural members of the cars in a quick and efficient manner. Straps are secured to the adaptors either before, or after they are installed and the adaptors are installed in place by suitable manipulation relative to the car structural members and do not require nails, or other fasteners, to hold them in place. The interrelationship between the adaptors and the structural members is such that when the strap is connected to the adaptors and then tensioned and sealed to retain the load in position, the loading on the adaptors acts to more tightly hold them in place. However, once the straps serving to retain the loads in position have been cut and the severed strap portions are free to move, the strap and/or adaptor can be rotated relative to its support, thus permitting the adaptor to be readily removed from the car. The adaptors and strapping are relatively inexpensive and expendable, which results in appreciable saving over the high cost of the equipment now used.

More particularly, the design of the adaptors is such that the adaptors and/or strap must be rotated more than 90° from the direction in which the adaptor is positioned when the strap connected thereto is under tension to permit removal of the adaptors from the structural support secured to the freight car sidewall.

In one embodiment of the invention, there is provided a generally U-shaped adaptor having aligned hook portions at its ends designed to fit into openings formed in the horizontally disposed flange of an angle iron that is welded to the car wall. When located in position, the one leg that is shorter than the other is generally vertically disposed and the other leg extends at approximately a 45° angle relative thereto. With this design, the shorter vertical leg must be moved through one of the openings in the angle iron a substantial distance in order to permit introduction of the longer leg into a spaced opening in the angle iron.

The aligned hook portions are integral with the ends of the legs and these hook portions interengage with the upper surface of the angle iron's horizontal flange to retain the adaptor in place relative thereto. The loading on the adaptor brings about an increased binding action between the adaptor and the support to securely retain the adaptor in position during loading. In order to remove the adaptor, the strap, which is looped about the vertical leg during loading, must be moved in excess of 90° to permit the shorter leg to be moved through the opening through which it extends to thus facilitate removal of the other leg from the angle iron. After the longer leg is removed from the angle iron, the first leg can then also be removed, thus separating the adaptor from the angle iron.

In a second embodiment of the invention, the adaptor includes two generally J-shaped legs, with the lower, semicircular portions juxtaposed and the upper portions diverging away from each other. The upper ends of the upper portions are integrally interconnected by a cross bar which together with the adjoining portions of the legs define a triangular section through which the strap extends. The structural member secured to the metal car sidewall with which this type of adaptor is used is hat-shaped and contains a plurality of openings located in a plane parallel to the sidewall of the car. The curved lower portions of the adaptors are adapted to fit through one opening and into an adjacent opening.

When a load is imposed on the adaptors by the action of tensioning the strap and securing it in position about the load to be retained in position in the box car, the effect is to more tightly bind the curved section of the adaptor to its support member. In order to remove the adaptor from the support member, it is necessary to rotate the adaptor approximately 150° from the direction at which it is disposed during loading, which thus eliminates the possibility of the adaptor being accidentally removed from its support when the strap is in a tensioned condition. To remove the adaptor obviously requires that the strap be released from the load, thus permitting rotation of the adaptor.

Other advantages of this invention will be apparent from the description of the following drawings, wherein:

FIG. 5 is a plan view showing a second embodiment of an adaptor;

FIG. 6 is a view showing the J-shaped adaptor in position relative to its support member;

FIG. 6a is an end view of the support shown in FIG. 6;

FIG. 7 is a view taken along line 7—7 of FIG. 6; and

FIG. 8 is a view showing the position of the adaptor prior to its insertion into or removal from its support.

Figure 1:
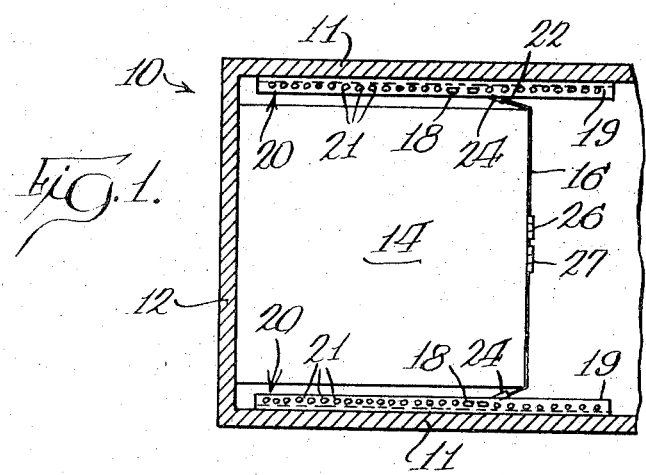
FIG. 1 shows a plan view of a freight car designed to accommodate a generally U-shaped adaptor.
Figure 2:
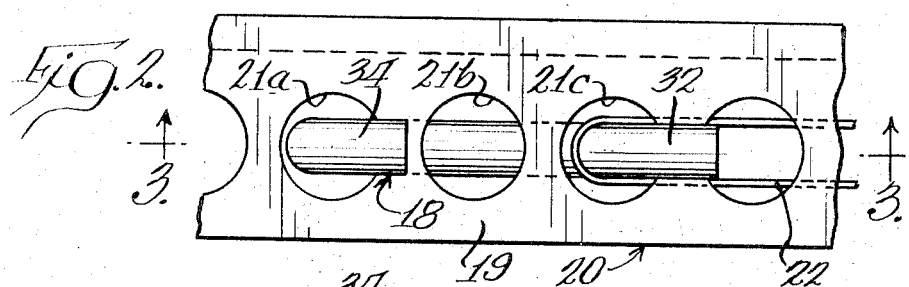
FIG. 2 is an enlarged plan view showing the adaptor in position relative to its support.

Referring first to FIG. 1, there is shown a metal freight car 10 having sidewalls 11 and an end wall 12. Shown located therein is a load 14, which is to be retained in position by tensioned straps 16. One end of each of the straps that are to be tensioned and sealed to retain the load 14 in position is to be anchored by the adaptor 18 forming one embodiment of the present invention. The adaptor 18 is designed to be releasably connected to the horizontally disposed flange 19 of the longitudinally extending angle iron supports 20. The vertical flanges of the angle irons 20 extend along the sidewall of the freight cars and are welded, or otherwise secured thereto. While one is illustrated, obviously as many as desired can be used. The adaptor 18 is designed to be extended through spaced openings 21 and anchor the straps relative to the angle irons 20. More particularly, as shown in FIG. 3, the adaptor 18 extends through spaced openings 21a, 21c.

The strap that is utilized to retain the load 14 in position is looped about the adaptor and the strap loop 22 is formed by seal 24. Overlapped straps 16 are then tensioned to secure the load 14 in position and the straps 16 are retained in position by suitably crimped seals 26, 27.

Figure 3:
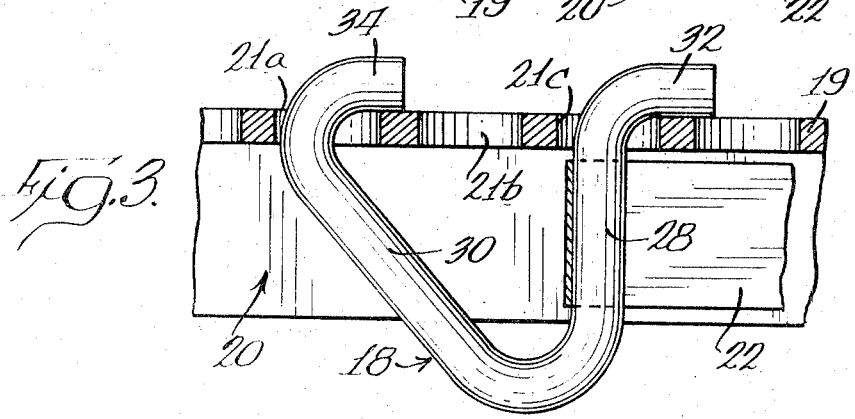
FIG. 3 is a view taken along line 3—3 of FIG. 2.

Referring now specifically to FIG. 3, there is shown the construction of the U-shaped adaptor 18. The adaptor includes legs 28 and 30, which have formed at their ends hook portions 32, 34, respectively. The leg 28 is the shorter of the two legs and when in position is disposed generally parallel to the axis of the opening 21c. The two legs are located at an acute angle with respect to each other, with the second, or longer leg 30 extending upwardly at approximtely a 45° angle relative to the short vertically disposed leg 28.

Figure 4:
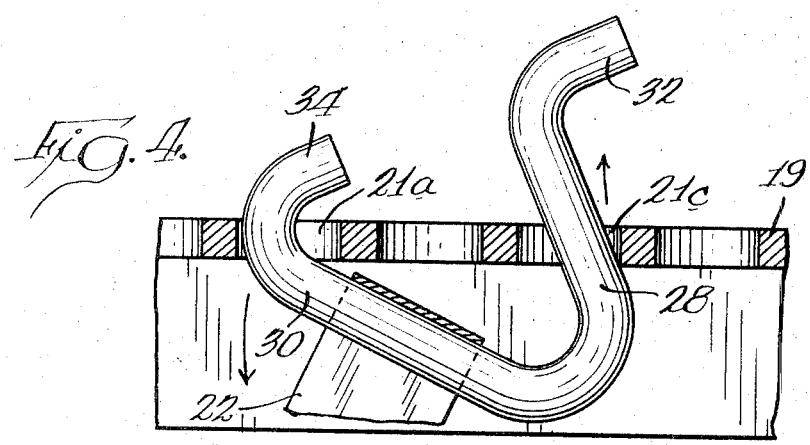
FIG. 4 is a view showing the position of the adaptor permitting it to be inserted into and removed from its support.

In order to place the hook in position relative to the flange 19, the adaptor is moved to the position shown in FIG. 4, which permits introduction of the hook portion 34 of the leg 30 through the opening 21a. After the hook 34 has been moved through the opening 21a, the body of the adaptor can be moved downwardly with the hooks 32, 34 abutting the upper surface of the flange 19, as shown in FIG. 3. If the strap has been placed on the adaptor before it was inserted, the strap would have been disposed about the leg 30 and then moved up into position about the leg 28. After the straps are in this position, they are then tensioned and sealed in place.

It can be appreciated that the tension on the straps 16 through the loops 22 acts to more securely lock the adaptor in position relative to the angle iron 20. The adaptor cannot be moved to the position shown in FIG. 4 until the interconnected straps 16 have been separated and the strap loop 22 moved from leg 28 to leg 30. This repositioning of the strap permits the adaptor to be moved to the position shown in FIG. 4, thus facilitating removal of the adaptor from the angle iron.

Referring now to the embodiment shown in FIGS. 5–8, it will be first noted that a number of the elements shown in FIGS. 1–4 are common to FIGS. 5–8 and thus the same numbers will be used where appropriate.

In the embodiment shown in FIGS. 5–8, the support member to which the adaptors 40 are to be secured is hat-shaped, as indicated by the numeral 42 (see FIG. 6a). This construction permits the introduction of the curved hooks 46 through the crown portion of the support member and provides space for the same between the support 42 and the sidewall of the car. The openings 43 in the support through which the adaptor extends are located in a plane parallel to the sidewall and when the adaptor 40 is located in position, it will be observed that the strap extends parallel to the support.

The adaptor 40 consists of two J-shaped legs 44 that are interconnected by leg 50 about which the strap loop 22 is disposed. The lower or curved portions 46 of the two legs are juxtaposed and are generally semi-circular in design. The upper portions 48 of the legs 44 slope backwardly to a slight degree and are interconnected at their ends by leg 50. The upper portions 46 extend through openings 43b and 43a into the position shown in FIG. 7. It can be appreciated that once in this position, the loading on the strap 16 through the loop 22 acts to more securely bind the adaptor relative to the support and the adaptor cannot be removed from the support until it is rotated approximately 150° to the position shown in FIG. 8.

While the invention has been directed to securing a load to the wall of a freight car, it is, of course obvious that the novel device disclosed herein can be used wherever it is necessary to secure a load in position relative to a stationary bulkhead.

It is, of course, intended to cover by the appended claims all such modifications and embodiments which fall within the scope of the claims.

What is claimed is:

1. An adaptor for anchoring a strap in position relative to a support defining a plurality of spaced openings, said adaptor being rigidly constructed and generally U-shaped with one rigid leg being longer than the other and each of said legs having rigid hook portions at its outer ends, the shorter of said leg being disposed normal to its respective hook portion and adapted to receive the strap in its loaded condition and the longer of said legs being disposed at an acute angle to its respective hook portion and adapted to receive the strap to permit removal of the adaptor from its support, said adaptor being constructed and arranged whereby the leg end portions extend through said spaced openings and the hook portions are disposed generally parallel to and abut said support on the side of said support opposite to where the strap is located to prevent removal of said adaptor from said support during normal loading of said adaptor, but which permits removal of the adaptor from its support when the strap is disposed about the longer leg and the adaptor is rotated in excess of 90° from the loading direction with the shorter leg being moved in the direction of its hook portion.

2. An adaptor as set forth in claim 1 in which the legs are disposed at an acute angle relative to each other and the hook portions extend in the same direction and are in alignment.

3. An adaptor as set forth in claim 2 in which the legs are disposed at approximately a 45° angle.

4. An adaptor for anchoring a strap in position relative to a support defining a plurality of spaced openings, said adaptor having a pair of rigid generally J-shaped legs with the curved generally semi-circular portion of said legs being juxtaposed and the upright portions of said legs extending away from each other and being connected at their outer ends by a transversely extending connecting member to define a generally triangularly shaped strap-receiving section, the plane of said triangular section, when extended, being located above the bottom of the curved portion of said legs whereby when the curved portions of said legs extend through the spaced openings of said support the adaptor can accommodate a high strap loading, and removal of the adaptor from its support requires rotation thereof in excess of 120° from the direction in which it is loaded.

* * * * *